United States Patent
Greenlaw

(10) Patent No.: US 8,505,091 B2
(45) Date of Patent: Aug. 6, 2013

(54) METHOD OF PROTECTING AGAINST DENIAL-OF-SERVICE ATTACKS

(75) Inventor: Jonathan E. Greenlaw, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1198 days.

(21) Appl. No.: 11/742,450

(22) Filed: Apr. 30, 2007

(65) Prior Publication Data

US 2008/0271118 A1    Oct. 30, 2008

(51) Int. Cl.
*H04L 29/06*    (2006.01)

(52) U.S. Cl.
USPC ........... 726/22; 726/23; 726/24; 726/25; 370/229; 370/230; 370/232; 370/233; 370/235; 370/235.1; 709/223; 709/224

(58) Field of Classification Search
USPC ........ 726/22–23; 370/229–240; 709/223–224
See application file for complete search history.

(56) References Cited

U.S. PATENT DOCUMENTS

| | | | |
|---|---|---|---|
| 6,424,624 B1 | 7/2002 | Galand et al. | |
| 7,203,963 B1 * | 4/2007 | Wu et al. | 726/23 |
| 2004/0215976 A1 * | 10/2004 | Jain | 713/201 |
| 2005/0157647 A1 * | 7/2005 | Sterne et al. | 370/235 |
| 2006/0075480 A1 * | 4/2006 | Noehring et al. | 726/12 |
| 2006/0282880 A1 | 12/2006 | Haverinen et al. | |
| 2007/0022479 A1 * | 1/2007 | Sikdar et al. | 726/22 |
| 2007/0030803 A1 | 2/2007 | Gooch et al. | |
| 2007/0171824 A1 * | 7/2007 | Ruello et al. | 370/232 |

OTHER PUBLICATIONS

Defending against Flooding-Based Distributed Denial-of-Service Attacks: A Tutorial by Rocky K.C. Chang; Publisher: IEEE; Year: 2002.*
Denial-of-Service Attack-Detection Techniques by Carl et al; Publisher: IEEE; Year: 2006.*
Proactively Detecting Distributed Denial of Service Attacks Using Source IP Address Monitoring by Peng et al; Publisher: Springer Berlin Heidelberg; Year: 2004.*

* cited by examiner

*Primary Examiner* — Madhuri Herzog

(57) ABSTRACT

An apparatus and method of protecting against a denial-of-service (DoS) attack are described. The apparatus comprises a classification engine, a meter engine, and a copy engine. The method comprises assigning a received packet to a meter based upon a classification of the network packet, determining that a DoS attack is in progress based upon a meter count, copying at least one packet from the meter to a processor; and suppressing the copying of subsequently received network packets to the processor.

17 Claims, 5 Drawing Sheets

METHOD OF PROTECTING AGAINST DENIAL-OF-SERVICE ATTACKS

BACKGROUND

Denial-of-Service (DoS) attacks aim to interrupt localized Internet services by making them temporarily unavailable by flooding the victim, e.g., a single Web host or an entire network served by an Internet Service Provider (ISP), with a high volume of packets originating from several machines.

Stopping a DoS attack normally requires first identifying and characterizing the attack at the victim side and usually is performed manually. Once understood, an ISP manually creates new filtering rules to be applied to routers handling the attack traffic. The number of required filters tends to increase rapidly, posing a scalability problem as well as performance degradation with high speed networks.

Traffic marking, traceback protocols, and pushback mechanisms have been the subjects of research as defense against DoS attacks. Intrusion pattern recognition is another source of research. However, these mechanisms are signature-based, therefore making them vulnerable to new, uncharacterized types of DoS attacks.

DESCRIPTION OF THE DRAWINGS

One or more embodiments are illustrated by way of example, and not by limitation, in the figures of the accompanying drawings wherein elements having the same reference numeral designations represent like elements throughout and wherein.

DETAILED DESCRIPTION

Figure 1:
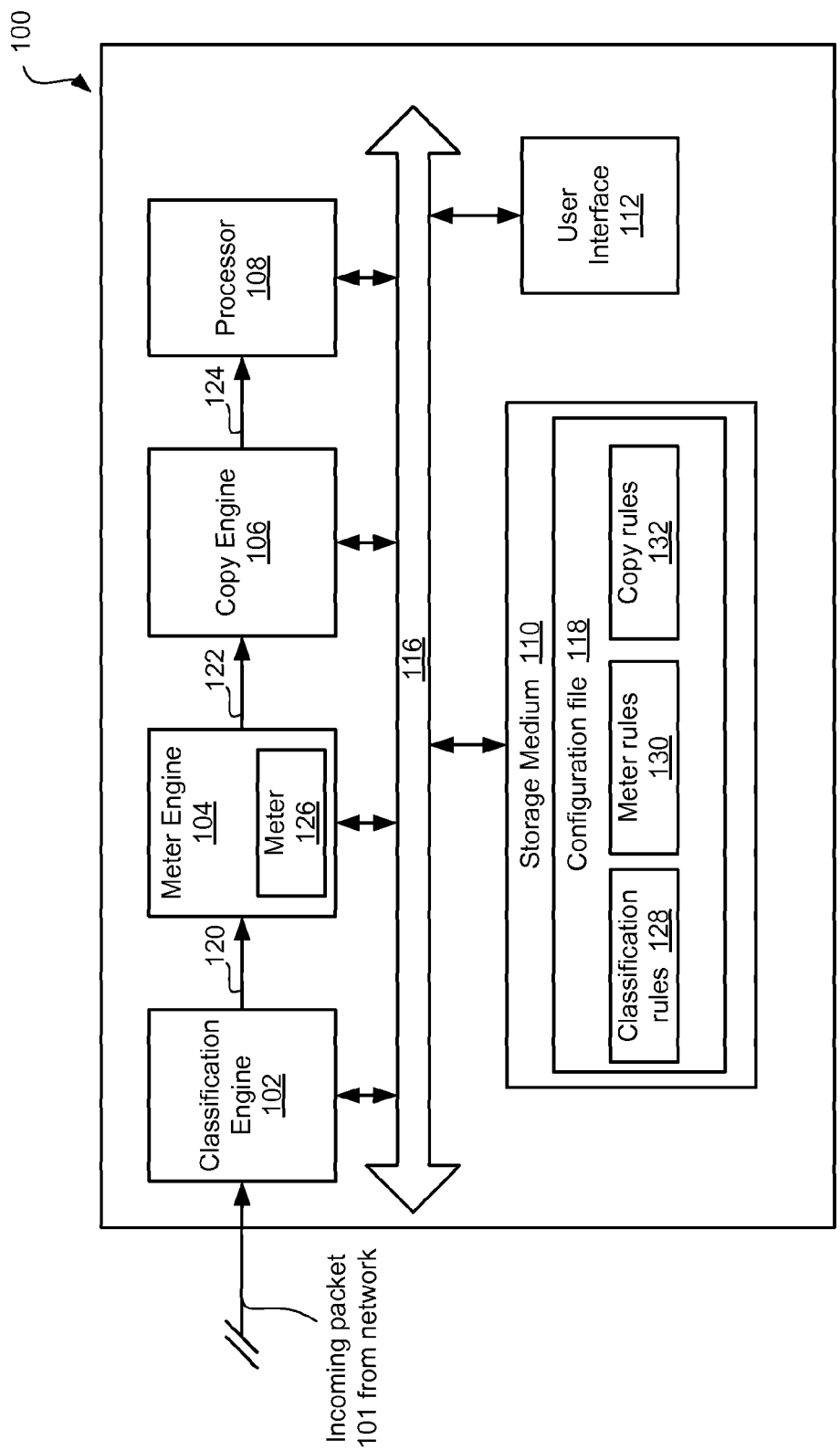
FIG. 1 is a high-level functional block diagram of a network device according to an embodiment.

FIG. 1 illustrates a high-level functional block diagram of a network device 100 according to an embodiment that discloses an apparatus and method of protecting against a denial-of-service (DoS) attack in which network device 100 would receive a large number of network packets 101 in a short period of time with the object of overloading processor 108 resulting in the failure of device 100. The apparatus and methods described herein prevent a processor 108 from being flooded with redundant messages.

In some embodiments, device 100 is a network router, ethernet switch, bridging device, or other network traffic handling device, etc. Network device 100 comprises a classification engine 102, a meter engine 104, and a copy engine 106 that operates to detect the occurrence of a DoS attack and throttle network packets forwarded to processor 108. Classification engine 102, meter engine 104, and copy engine 106 operate based upon rules, e.g., classification rules 128, meter rules 130, and copy rules 132, respectfully that, in some embodiments, are stored in a configuration file 118. In other embodiments the rules by which engines 102, 104, and 106 operate are distributed and stored in the engines themselves.

Furthermore, classification engine 102, meter engine 104, and copy engine 106 communicate with each other and/or with other device components, e.g. storage medium 110, user interface 112, and processor 108, via a communication bus 116 or via communication channels 120, 122, and 124 that enable classification engine 102, meter engine 104, and copy engine 106 to forward received packets 101 to their respective destination, e.g. engines 102, 104, 106 and processor 108, independent of bus 116. For example, in addition to forwarding packets 101, in some configurations, classification engine 102, meter engine 104, and copy engine 106 read configuration file 118 directly from storage medium 110 independent of processor 108.

Classification engine 102 receives incoming network packet 101 from a network connection and identifies the received packet as a particular type of network traffic, such as network connection management protocol (NCMP) requests. Upon identifying network packet 101, classification engine 102 assigns packet 101 to a meter 126 associated with the type of network traffic identified by the classification engine 102, passing the packet 101 to meter engine 104 over channel 120 or bus 116.

Non-limiting, although FIG. 1 depicts a single meter 126, an authorized user may establish multiple meters so as to more precisely monitor different types of network traffic types.

Meter engine 104 monitors each meter 126 and is operable to control the number of packets of each monitored network type that is forwarded to copy engine 104 by applying a predetermined packet flow rate to bursty network traffic.

Copy engine 106 is configured to receive packets from the meter engine 104 and copy the packet 101 to processor 108. When meter engine 104 determines that the number of incoming packets assigned to a particular meter 126 is greater than a predetermined rate, copy engine 106 is directed to throttle the number of packet 101 that are copied to processor 108 based upon copy rule 132.

Furthermore, in some embodiments, an authorized user is permitted to modify operation of the engines 102, 104, and 106 via appropriate changes to parameters, i.e., rules 128, 130, and 132, within configuration file 118. An authorized user implements changes to configuration file 118 via a user interface 112 that includes, but is not limited to, a local interface, such as a command line interface (CLI) or graphical user interface (GUI), or via a remote device, using a network protocol, such as a Simple Network Management Protocol (SNMP).

Figure 2:
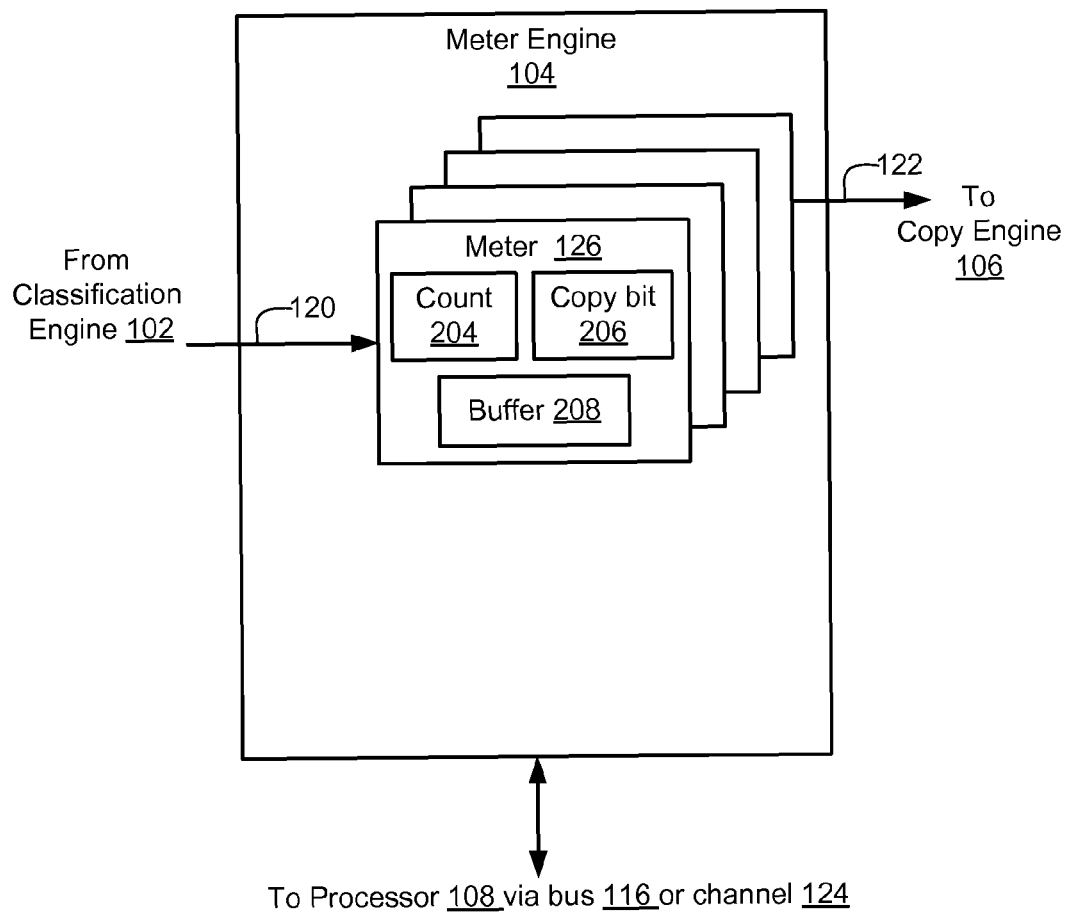
FIG. 2 is a detailed block diagram of a network device according to an embodiment.

FIG. 2 illustrates meter engine 104 comprising at least one meter 126 that further comprises a meter count 204, a copy bit 206 and a buffer 208. In some embodiments, meter count 204 is configured as an up/down counter that is initially set to a predetermined value stored in configuration file 118. In this embodiment, meter engine 104 decrements meter count 204 for each packet 101 assigned to meter 126. In addition, meter engine 104 periodically adds a predetermined number of counts to each meter 126, wherein the number of counts to add to count 204, and the periodic interval at which to add the counts, are user configurable and stored in meter rules 130.

Each network traffic meter 126 is configured to manage a predetermined incoming packet rate associated with that meter, such that incoming packets 101 operate to decrease count 204 while meter engine 104 periodically replenishes meter count 204 by adding additional counts. Accordingly, under normal network traffic situations, a properly configured meter 126 would comprise a count 204 greater than zero, indicating that the rate of incoming packets associated with a particular traffic type is not above a predetermined threshold.

Thus, meter engine 104 forwards packet 101 over channel 122 or bus 116 to copy engine 106 for subsequent forwarding to processor 108.

A high rate of incoming packets 101, such as in the case of a DoS attack, may result in count 204 becoming zero, triggering a mechanism to protect processor 108 from receiving a flood of network packets. If count 204 becomes zero, meter engine 104 sets copy bit 206, i.e., assigns copy bit 206 a particular value. In some embodiments, copy bit 206 is a hardware register and "setting" copy bit 206 sets an output driver to a high voltage. In a software implementation of copy bit 206, "setting" copy bit 206 may result in a memory location of storage medium 110 being set to either a logical "1" or "0" depending upon a design choice of the programmer.

In some embodiments, meter engine 104 is disabled, i.e., meter count 204 being neither decremented nor periodically replenished, until copy bit 206 is reset. Accordingly, in embodiments wherein classification engine 102 continues to assign incoming packets 101 to meter 126, incoming packets to a disabled meter 126 are dropped, or in other programmable configurations, buffered in buffer 208.

Upon receiving packet 101 from meter engine 104, copy engine reads copy bit 206. If not set, copy engine 106 copies and forwards packet 101 to processor 108. If copy bit 206 is set, indicating that a DoS attack may be in progress, copy engine 106 operates to throttle packets being copied to processor 108 based upon copy rule 132. In some embodiments, copy engine 106 forwards a single packet 101 of that particular traffic type to processor 108. In other embodiments, copy rule 132 instructs copy engine 106 to copy to processor 108 a predetermined number of packets 101, or copy every $n^{th}$ packet, or another throttling mechanism, until copy bit 206 is reset.

Upon processing the packet 101 that initiated the setting of copy bit 206, processor 108 instructs meter engine 104 to reset copy bit 206 and enable meter 126, if disabled. Furthermore, meter engine 104 is operable to set meter count 204 to a predetermined value, i.e., an initialization value, when enabling meter 126 either upon startup or upon being enabled.

Figure 3:
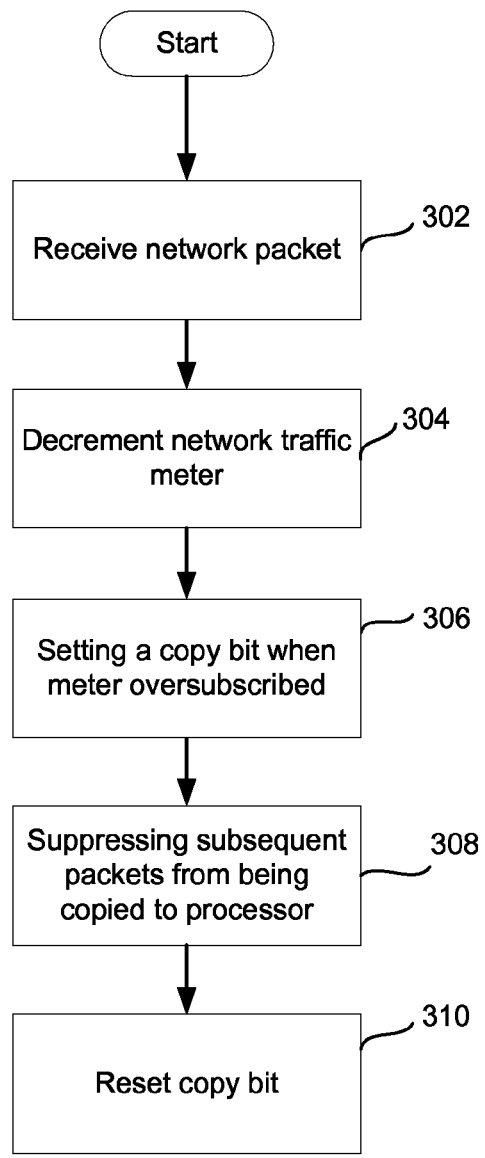
FIG. 3 is a flowchart illustrating a method according to an embodiment.

FIG. 3 illustrates a high level flowchart of an embodiment performing the methods described herein and begins at receive packet functionality 302 wherein the network device 100 receives a network packet 101. After network device 100 receives packet 101, the packet is forwarded to meter engine 104 which executes decrement functionality 304 to decrement network traffic meter 126. During decrement functionality 304, meter engine 104 determines whether meter count 206 is zero, and operation proceeds to set copy bit functionality 306 wherein copy bit 206 is set if meter count 206 is zero. If copy bit 206 is set, copy engine 106 forwards a single copy of network packet 101 to processor 108. In some embodiments, the setting of copy bit 206 disables meter 126, preventing further packets from being forwarded to copy engine 106.

Based upon copy rule 132 and the setting of copy bit 206, copy engine 106 suppresses packets 101 from being forwarded to processor 108. In some embodiments, a single packet 101 is to processor 108 and functionality 308 suppresses at least a predetermined number of subsequent packets 101, (defined in the configuration file 118), from being copied by copy engine 106 to processor 108 until such time as copy bit 206 is reset, i.e., by meter engine 104 upon being notified that processor 108 has processed the packet 101, or directly by processor 108.

Figure 4:
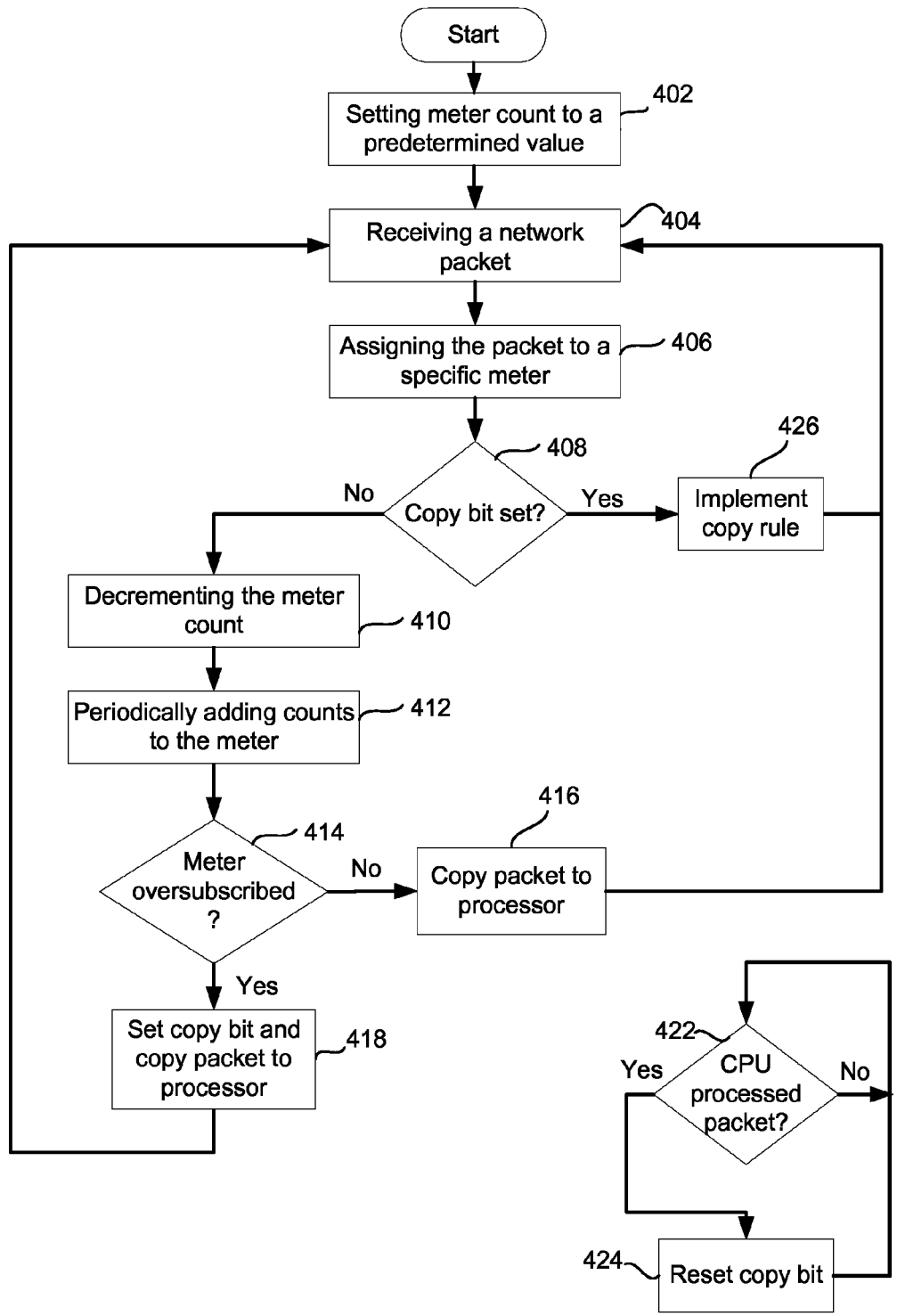
FIG. 4 is a flowchart illustrating another method according to an embodiment.

FIG. 4 illustrates another flowchart of an embodiment performing the methods described herein and begins with meter engine 104 setting (402) a count 204 of at least one meter 126 to a predetermined value.

Upon receiving (404) a network packet 101, classification engine 102 assigns (406) received packet 101 to a specific meter 126 based upon the traffic type of the packet 101, as defined by configurable rules set in configuration file 118. After assigning a packet 101 to a meter 126, classification engine 102 forwards the packet to meter engine 104.

Upon receipt of packet 101, meter engine 104 checks (408) to see if copy bit 206 is set. If set, meter engine 104 processes (426) packet 101 based upon rules stored in configuration file 118. Non-limiting, configuration file 118 may comprise a rule instructing meter engine 104 to drop packet 101 until such time as copy bit 206 is reset.

If copy bit 206 is not set, in some embodiments, decrementing functionality 410 causes meter engine 104 to decrement meter count 206 prior to a functionality 414 of determining if meter count 206 is zero.

Periodically, and in some embodiments based upon a interrupt mechanism (412), a predetermined number of counts, defined in configuration file 118, is added to meter count 204. By proper setting of the number of counts to add to meter count 206, meter count 204 is regulated so as to reduce the occurrences wherein meter count 204 reaches zero.

If meter count 204 is greater than zero, the process continues by forwarding (416) packet 101 to copy engine 106, which copies packet 101 to processor 108.

If meter count 204 is zero, meter engine 104 forwards the packet to copy engine 106 and additionally sets (418) copy bit 206. Upon receipt of packet 101 and based upon copy bit 206 being set, copy engine 106 is operable to execute copy rule 132, which in some embodiments, instructs copy engine 106 to copy a single packet 101 to processor 108. In other embodiments, a predetermined number of copied packets are forwarded to processor 108. Furthermore, in some embodiments, the meter is disabled so that packets subsequently received and classified are not copied to the processor. Furthermore, in some embodiments, after processor 108 processes the copied packet 101, other corrective actions may be initiated, such as filtering a portion of network packet traffic from the source of the packets that caused meter 126 to be oversubscribed.

Once copy bit 206 of a particular type of traffic meter 126 is set, subsequent packets of that type are prevented from being copied to processor 108 until such time as processor 108 processes (422) packet 101 and resets (424) copy bit 206.

Figure 5:
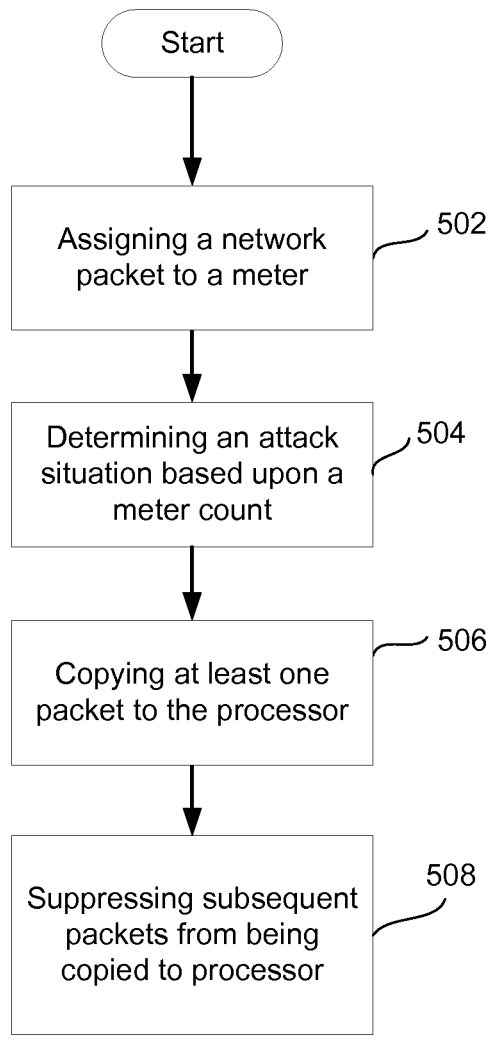
FIG. 5 is a flowchart illustrating another method according to an embodiment.

FIG. 5 illustrates another embodiment of a method of protecting against a DoS attack and comprises functionality 502 that classifies a received network packet 101 according to a particular network type. In some embodiments, functionality 502 is performed by a network device, such as router 100, using classification engine 102.

In some embodiments, classification engine 102 is further operable to perform an assignment functionality 504 that is responsible for assigning a received packet to a meter 126 based upon the classification of the network packet 101.

Meter engine 104 is operable to perform an attack determining function 506 based upon meter count 204. In some embodiments, meter engine 104 sets copy bit 206 when meter count 204 reaches zero, indicating a possible DoS attack.

Copy engine 106 is operable to perform copy function 508 that suppresses subsequent packets forwarded from meter 126 from being copied to processor. When copy bit 206 is not set, copy engine 106 forwards each packet 101 received from meter engine 104 to processor 108. When copy bit 206 is set, copy engine 106 forwards a packet 101 to processor 108 based upon rules stored in configuration file 118. In some embodiments and based upon a copy rule 132 in configuration file 118, copy engine 106 forwards a single packet to processor 108. Other throttling mechanism may be implemented, including, but not limited to forwarding a predetermined number of packets, or every nth packet subsequently received from meter 126 to processor 108, until the copy bit is reset.

The functions of methods described in connection with the embodiments disclosed herein, i.e., classification engine 102, meter engine 104, and copy engine 106, may be embodied directly in hardware, in a set of executable instructions stored in a storage medium 110 executed by one or more processors 108, or in a combination thereof. Storage medium 110 may comprise RAM memory, flash memory, ROM memory, PROM memory, EPROM memory, EEPROM memory, registers, hard disk, a removable disk, a CD-ROM, or another form of storage medium. In at least some embodiments, storage medium 110 is integral to processor 106. In some further embodiments, processor 108 and one or storage medium 110 may reside in an ASIC.

The functions and methods described above permit very specific threats to be isolated and forwarded to a processor for further action and preclude exploitation to create a separate DoS attack.

What is claimed is:

1. A method of protecting against a denial-of-service (DOS) attack by a network device, the method comprising:
   receiving a network packet;
   classifying the received network packet according to a particular type of network traffic as defined by configurable rules set in a configuration file;
   assigning the received network packet to a specific meter of a number of meters based upon the classification of the received network packet, wherein the specific meter includes a meter count and a copy bit;
   determining, by the network device, whether the copy bit of the specific meter is set;
   adjusting the meter count of the specific meter in response to a determination that the copy bit is not set;
   determining that a DoS attack is in progress based upon a value of the adjusted meter count of the specific meter;
   copying the received network packet from the specific meter to a processor;
   suppressing the copying of subsequently received network packets from the specific meter to the processor; and
   periodically adding a predetermined fixed number of counts to the meter count before the adjusted meter count reaches a threshold.

2. The method of claim 1, further comprising setting the copy bit for the specific meter upon determining that a DoS attack is in progress;
   wherein copying the received packet from the specific meter to the processor includes copying the received packet from the specific meter to the processor while the copy bit for the specific meter is set;
   wherein suppressing the copying of subsequently received network packets from the specific meter to the processor includes suppressing the copying of subsequently received network packets from the specific meter to the processor while the copy bit for the specific meter is set; and
   wherein the method further comprises resetting the copy bit after the copied packet is processed by the processor.

3. The method of claim 2, further comprising forwarding packets from other of the number of meters to the processor while the copy bit for the specific meter is set.

4. The method of claim 3, further comprising disabling the specific meter at approximately the same time as when the copy bit is set.

5. The method of claim 3, further comprising dropping received packets received after the copy bit has been set.

6. An apparatus for protecting against a denial-of-service (DOS) attack, comprising:
   a memory storing an engine comprising machine readable instructions to:
   classify a received network packet according to a particular network type as defined by configurable rules set in a configuration file;
   assign the received network packet to a specific meter of a number of meters based upon the classification of the received network packet, wherein the specific meter includes a meter count and a copy bit;
   determine whether the copy bit of the specific meter is set;
   decrement the meter count of the specific meter in response to a determination that the copy bit is not set;
   determine that a denial-of-service (DOS) attack is in progress based upon a value of the decremented meter count of the specific meter;
   copy the received packet from the specific meter to a processor;
   suppress the copying of subsequently received network packets from the specific meter to the processor; and
   periodically add a predetermined fixed number of counts to the meter count before the decremented meter count reaches a threshold,
   wherein the processor is to implement the engine.

7. A non-transitory computer-readable medium storing a set of instructions executable by a processor to perform a method of protecting against a denial-of- service (DOS) attack, the instructions comprising:
   a first set of codes for causing a computer to classify a received network packet according to a particular network type as defined by configurable rules set in a configuration file;
   a second set of codes for causing a computer to assign the received packet to a specific meter of a number of meters based upon the classification of the received network packet, wherein the specific meter includes a meter count and a copy bit;
   a third set of codes for causing a computer to determine whether the copy bit of the specific meter is set, decrement the meter count of the specific meter in response to a determination that the copy bit is not set, and determine that a DoS attack is in progress based upon a value of the decremented meter count of the specific meter;
   a fourth set of codes for causing a computer to copy the received network packet from the specific meter to a processor;
   a fifth set of codes for causing a computer to suppress the copying of subsequently received network packets from the specific meter to the processor; and
   a sixth set of codes for causing a computer to periodically add a predetermined fixed number of counts to the meter count before the decremented meter count reaches a threshold.

8. An apparatus for protecting against a denial-of-service (DOS) attack, comprising:
   a hardware classification engine to assign a received network packet to a particular network traffic meter of a number of meters as a particular type of network traffic as defined by configurable rules set in a configuration file;

a hardware meter engine comprising the number of meters including the particular network traffic meter, the particular network traffic meter having a meter count and a copy bit, the meter engine to receive the assigned network packet from the classification engine, determine whether the copy bit of the particular network traffic meter is set, decrement the meter count of the particular network traffic meter in response to a determination that the copy bit is not set, determine whether a DoS attack is in progress based upon a value of the decremented meter count of the particular network traffic meter, and set the copy bit of the particular network traffic meter based upon the meter count of the particular network traffic meter indicating that a DoS attack is in progress;

a hardware copy engine to receive the network packet from the particular network traffic meter of the meter engine, copy the received network packet to a processor while the copy bit for the particular network traffic meter is set, and suppress the copying of a predetermined number of subsequently received packets from the particular network traffic meter while the copy bit for the particular network traffic meter is set; and logic to periodically add a predetermined fixed number of counts to the meter count of the particular network traffic meter before the decremented meter count reaches a threshold.

9. The apparatus of claim 8, further comprising logic to reset the copy bit for the particular network traffic meter after the network packet is processed by the processor.

10. The apparatus of claim 8, further comprising the configuration file comprising rules operable on by at least one of the hardware classification engine, the hardware meter engine, and the hardware copy engine.

11. The apparatus of claim 10, wherein the configuration file comprises a rule determining when to forward a packet to the processor when the copy bit is set for the particular network traffic meter.

12. The apparatus of claim 10, wherein the configuration file comprises a rule to filter at least a portion of traffic received from a determined network device.

13. The apparatus of claim 6, further comprising machine readable instructions to:
set the copy bit for the specific meter upon determining that a DoS attack is in progress,
wherein the machine readable instructions to copy the received network packet from the specific meter to the processor include the machine readable instructions to copy the received network packet from the specific meter to the processor while the copy bit for the specific meter is set, and
wherein the machine readable instructions to suppress the copying of subsequently received network packets from the specific meter to the processor include the machine readable instructions to suppress the copying of subsequently received network packets from the specific meter to the processor while the copy bit for the specific meter is set; and
reset the copy bit after the copied packet is processed by the processor.

14. The apparatus of claim 13, further comprising machine readable instructions to:
forward packets from other of the number of meters to the processor while the copy bit for the specific meter is set.

15. The non-transitory computer-readable medium of claim 7, wherein the instructions further comprise a seventh set of codes for causing a computer to set the copy bit for the specific meter upon determining that a DoS attack is in progress;
wherein the fourth set of codes cause a computer to copy the received network packet from the specific meter to the processor while the copy bit for the specific meter is set;
wherein the fifth set of codes cause a computer to suppress the copying of subsequently received network packets from the specific meter to the processor while the copy bit for the specific meter is set; and
wherein the instructions further comprise an eighth set of codes for causing a computer to reset the copy bit after the copied packet is processed by the processor.

16. The non-transitory computer-readable medium of claim 15, wherein the instructions further comprise a ninth set of codes for causing a computer to forward packets from other of the number of meters to the processor while the copy bit for the specific meter is set.

17. The apparatus of claim 9, further comprising logic to forward packets from other network traffic meters to the processor while the copy bit for the particular network traffic meter is set.

* * * * *